United States Patent
More (10) Patent No.: US 9,232,210 B2
(45) Date of Patent: Jan. 5, 2016

(54) MAPPING SUB-PORTIONS OF THREE-DIMENSIONAL (3D) VIDEO DATA TO BE RENDERED ON A DISPLAY UNIT WITHIN A COMFORTABLE RANGE OF PERCEPTION OF A USER THEREOF

(71) Applicant: NVIDIA Corporation, Santa Clara, CA (US)

(72) Inventor: Nilesh More, Maharashtra (IN)

(73) Assignee: NVIDIA Corporation, Santa Clara, CA (US)

( * ) Notice: Subject to any disclaimer, the term of this patent is extended or adjusted under 35 U.S.C. 154(b) by 249 days.

(21) Appl. No.: 13/936,237

(22) Filed: Jul. 8, 2013

(65) Prior Publication Data
US 2015/0009306 A1    Jan. 8, 2015

(51) Int. Cl.
*H04N 13/04* (2006.01)
*H04N 13/00* (2006.01)

(52) U.S. Cl.
CPC ....... *H04N 13/0033* (2013.01); *H04N 13/0022* (2013.01)

(58) Field of Classification Search
USPC ........................................................ 345/419
See application file for complete search history.

(56) References Cited

U.S. PATENT DOCUMENTS 8,390,674 B2    3/2013  Kim et al.
8,587,638 B2 *  11/2013 Pockett ........................... 348/51
2010/0091012 A1 *  4/2010  Newton et al. ................. 345/419
2011/0109720 A1 *  5/2011  Smolic et al. .................... 348/43
2012/0084652 A1    4/2012  Martinez Bauza et al.
2012/0327197 A1 *  12/2012 Yamashita et al. .............. 348/50

FOREIGN PATENT DOCUMENTS

WO    2013064938 A1    5/2013

OTHER PUBLICATIONS

"2013 Electronic Imaging," Science and Technology, Technical Summaries, IS&T/SPIE, Feb. 3-7, 2013, pp. 1-150, retrieved from http://spie.org/Documents/ConferencesExhibitions/ei13-abstracts-L.pdf.

* cited by examiner

*Primary Examiner* — Kimbinh T Nguyen
(74) *Attorney, Agent, or Firm* — Zilka-Kotab, PC (57) ABSTRACT

A method includes receiving, through a processor of a data processing device communicatively coupled to a memory, data related to a dimensional parameter of a display unit and/or a distance between a user and the display unit, and determining, through the processor, a comfortable range of perception of a sub-portion of three -dimensional (3D) video data on the display unit based on the dimensional parameter of the display unit and/or the distance between the user and the display unit. The method also includes adjusting, through the processor, a disparity between one or more sub -portion(s) of the 3D video data corresponding to perception of the sub-portion by a left eye of the user and one or more sub-portion(s) of the 3D video data corresponding to perception of the sub-portion by a right eye of the user such that the sub-portion is mapped within the determined comfortable range of perception.

23 Claims, 5 Drawing Sheets

MAPPING SUB-PORTIONS OF THREE-DIMENSIONAL (3D) VIDEO DATA TO BE RENDERED ON A DISPLAY UNIT WITHIN A COMFORTABLE RANGE OF PERCEPTION OF A USER THEREOF

FIELD OF TECHNOLOGY

This disclosure relates generally to video post-processing and, more particularly, to a method, a device and/or a system for mapping sub-portions of three-dimensional (3D) video data to be rendered on a display unit within a comfortable range of perception of a user thereof.

BACKGROUND

A user of a data processing device (e.g., a desktop computer, a laptop computer, a smart display, a notebook computer, a netbook, a mobile device such as a tablet or a mobile phone) may view three-dimensional (3D) video data on a display unit associated therewith. One or more factor(s) such as proximity of the user to the display unit, a size of the display unit and a video parameter of the 3D video data such as color and contrast may contribute to eye strain, at least on prolonged viewing of the 3D video data on the display unit by the user. The user may have to manually modify the video parameter and/or physically move to a different location in order to have the eye strain thereof reduced. The aforementioned requirements may significantly inconvenience the user.

SUMMARY

Disclosed are a method, a device and/or a system for mapping sub-portions of three-dimensional (3D) video data to be rendered on a display unit within a comfortable range of perception of a user thereof.

In one aspect, a method to reduce eye strain of a user during viewing of 3D video data on a display unit associated with a data processing device is disclosed. The method includes receiving, through a processor of the data processing device communicatively coupled to a memory, data related to a dimensional parameter of the display unit and/or a distance between the user and the display unit, and determining, through the processor, a comfortable range of perception of a sub-portion of the 3D video data on the display unit based on the dimensional parameter of the display unit and/or the distance between the user and the display unit. The comfortable range of perception is related to a perception range within which the user is expected to experience reduced eye strain.

The method also includes adjusting, through the processor, a disparity between one or more sub-portion(s) of the 3D video data corresponding to perception of the sub-portion by a left eye of the user and one or more sub-portion(s) of the 3D video data corresponding to perception of the sub-portion by a right eye of the user such that the sub-portion is mapped within the determined comfortable range of perception. The disparity adjustment is performed across one or more spatial dimension(s).

In another aspect, a data processing device is disclosed. The data processing device includes a memory having 3D video data therein and a processor communicatively coupled to the memory. The processor is configured to receive data related to a dimensional parameter of a display unit and/or a distance between a user and the display unit. Based on the received data, the processor is further configured to execute instructions to determine a comfortable range of perception of a sub-portion of the 3D video data on the display unit based on the dimensional parameter of the display unit and/or the distance between the user and the display unit. The comfortable range of perception is related to a perception range within which the user is expected to experience reduced eye strain during viewing of the 3D video data on the display unit.

The processor is also configured to execute instructions to adjust a disparity between one or more sub-portion(s) of the 3D video data corresponding to perception of the sub-portion by a left eye of the user and one or more sub-portion(s) of the 3D video data corresponding to perception of the sub-portion by a right eye of the user such that the sub-portion is mapped within the determined comfortable range of perception. The disparity adjustment is performed across one or more spatial dimension(s).

In yet another aspect, a system is disclosed. The system includes a data source of 3D video data, and a client device communicatively coupled to the data source. The client device is configured to receive the 3D video data and data related to a dimensional parameter of a display unit and/or a distance between a user and the display unit. Based on the received data, the client device is configured to determine a comfortable range of perception of a sub-portion of the 3D video data on the display unit based on the dimensional parameter of the display unit and/or the distance between the user and the display unit. The comfortable range of perception is related to a perception range within which the user is expected to experience reduced eye strain during viewing of the 3D video data on the display unit.

The client device is also configured to adjust a disparity between one or more sub-portion(s) of the 3D video data corresponding to perception of the sub-portion by a left eye of the user and one or more sub-portion(s) of the 3D video data corresponding to perception of the sub-portion by a right eye of the user such that the sub-portion is mapped within the determined comfortable range of perception. The disparity adjustment is performed across one or more spatial dimension(s).

The methods and systems disclosed herein may be implemented in any means for achieving various aspects, and may be executed in a form of a machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF THE DRAWINGS

The embodiments of this invention are illustrated by way of example and not limitation in the figures of the accompanying drawings, in which like references indicate similar elements and in which.

Other features of the present embodiments will be apparent from the accompanying drawings and from the detailed description that follows.

DETAILED DESCRIPTION

Example embodiments, as described below, may be used to provide a method, a system and/or a device for mapping sub-portions of three-dimensional (3D) video data to be rendered on a display unit within a comfortable range of perception of a user thereof. Although the present embodiments have been described with reference to specific example embodiments, it will be evident that various modifications and changes may be made to these embodiments without departing from the broader spirit and scope of the various embodiments.

Figure 1:
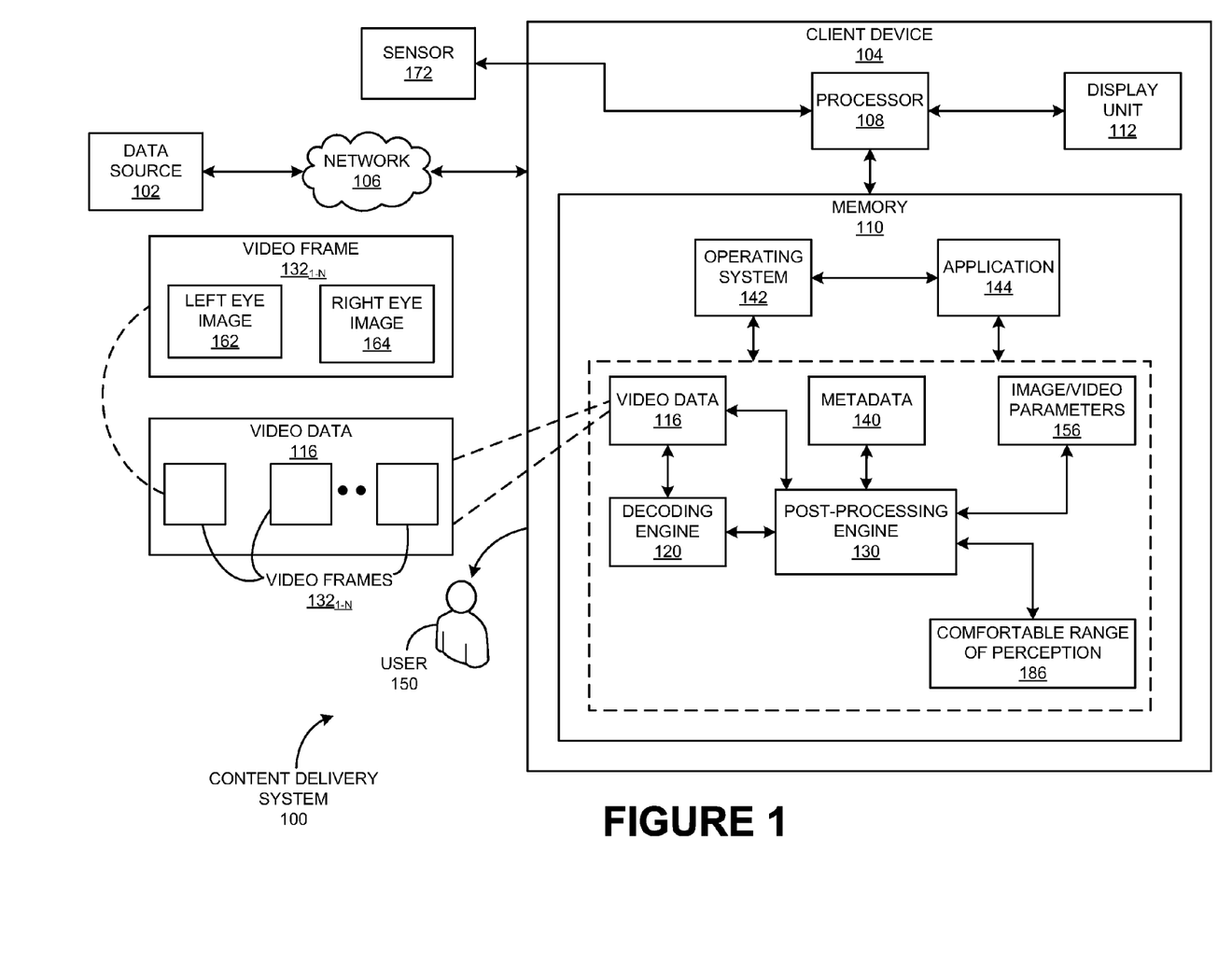
FIG. 1 is a schematic view of a content delivery system, according to one or more embodiments.

FIG. 1 shows a content delivery system 100, according to one or more embodiments. In one or more embodiments, content delivery system 100 may include a data source 102 (e.g., a server, a computing device) communicatively coupled to one or more client devices (e.g., client device 104) through a network 106 (e.g., Internet, Local Area Network (LAN), Wide Area Network (WAN)). It is obvious that a single client device 104 is merely shown as an example in FIG. 1. In one or more example scenarios, data source 102 may be a server configured to generate real-time data (e.g., in a cloud-gaming environment, a video-conferencing environment), encode the aforementioned real-time data as video data and transmit the video data to client device 104 through network 106. In one or more other example scenarios, data source 102 may be a server configured to host video data to be downloaded (e.g., through the Internet) to client device 104; data source 102 may also be a mere personal computer transmitting data wirelessly (e.g., through Wi-Fi®) to a tablet (an example client device 104) coupled to a television (for display purposes) through, say, a High-Definition Multimedia Interface (HDMI) cable.

Further, it should be noted that content delivery system 100 is not limited to data transmission through network 106. For example, concepts discussed herein may also be applicable to processing associated with files locally generated and/or stored on, say, client device 104; here, data source 102 and client device 104 are the same. Examples of client device 104 may include, but are not limited to, a desktop computer, a laptop computer, a notebook computer, a smart display, a netbook and a mobile device such as a tablet or a mobile phone.

FIG. 1 shows client device 104 as including a processor 108 communicatively coupled to a memory 110. In one or more embodiments, processor 108 may be a Central Processing Unit (CPU), a Graphics Processing Unit (GPU) or any dedicated processor configured to execute an appropriate decoding engine 120 thereon (decoding engine may instead be hardware); the dedicated processor may, alternately, be configured to control the appropriate decoding engine executing on another processor. All variations therein are within the scope of the exemplary embodiments. In one or more embodiments, memory 110 may be a volatile memory and/or a non-volatile memory. FIG. 1 shows decoding engine 120 (e.g., a set of instructions) as being stored in memory 110.

FIG. 1 also shows video data 116 (e.g., video data transmitted from data source 102, locally generated and/or stored video data) as being stored in memory 110. Video data 116 may include a number of video frames $132_{1-N}$ encoded as a video sequence. In one or more embodiments, prior to rendering of video data 116 on a display unit 112 (shown as being interfaced with processor 108), decoding engine 120 may be configured to decode the video sequence. In one or more embodiments, video data 116 may be associated with stereoscopic three-dimensional (3D) video content. In one or more embodiments, processor 108 may execute a post-processing engine 130 (shown as being stored in memory 110) configured to process an output of decoding engine 120 in accordance with metadata 140 (stored in memory 110; to be discussed below) prior to rendering thereof on display unit 112. In one or more embodiments, the aforementioned execution of post-processing engine 130 may enable reduction of eye strain on part of a user 150 of client device 104 during viewing of video data 116 on display unit 112.

In one or more embodiments, a video frame $132_{1-N}$ of video data 116 may include a left eye image 162 and a right eye image 164 with reference to user 150 packed together; left eye image 162 and right eye image 164 may have a slight offset therebetween to provide for a stereoscopic effect to user 150. In one or more embodiments, viewing of 3D video data 116 on display unit 112 for a prolonged duration may cause the abovementioned eye strain on part of user 150. Exemplary embodiments may provide a means to reduce/minimize the eye strain through adjusting left eye image 162 and/or right eye image 164, removing image disparities (to be discussed below), optimizing image/video parameters 156 (shown as being stored in memory 110) such as color and contrast etc. in accordance with metadata 140. In one or more embodiments, metadata 140 may be data associated with display unit 112 such as one or more dimension(s) thereof and a distance between user 150 and display unit 112.

Figure 2:
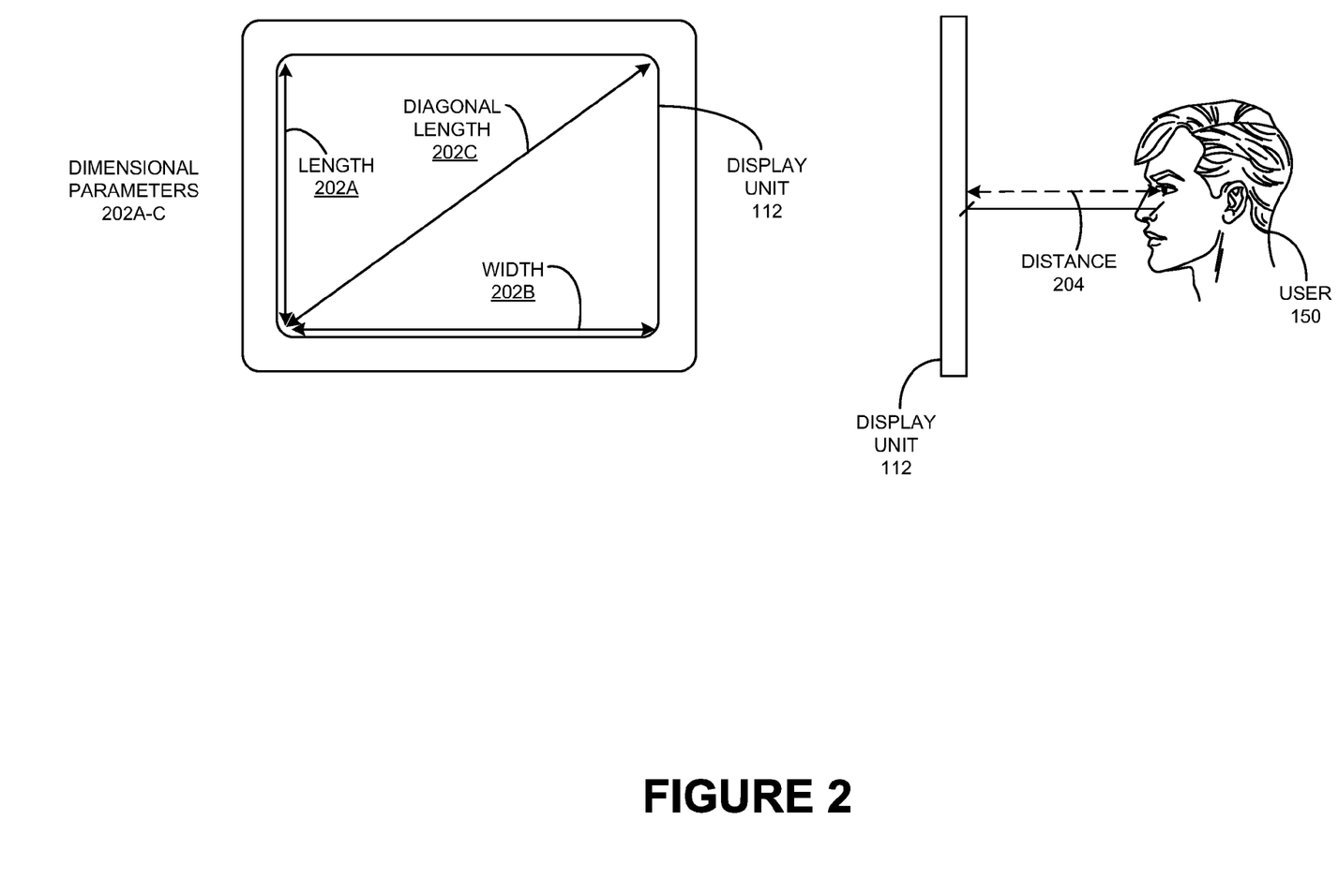
FIG. 2 is a schematic view of dimensional parameters of a display unit of a client device of FIG. 1.

FIG. 2 shows dimensional parameters 202A-C of display unit 112. Dimensional parameters 202A-C may include a length 202A of a screen thereof, a width 202B of the screen and a diagonal length 202C of the screen. The aforementioned dimensional parameters 202A-C are shown merely for example purposes. Other forms of dimensional parameters 202A-C are within the scope of the exemplary embodiments discussed herein. Further, FIG. 2 shows a distance 204 between display unit 112 and user 150. In one or more embodiments, data related to distance 204 may be sensed through one or more sensors (e.g., sensor 172 shown in FIG. 1 as being interfaced with processor 108) associated with client device 104, based on which distance 204 is determined through processor 108. Sensing of distance 204 is well known to one skilled in the art; therefore, detailed discussion associated therewith has been skipped for the sake of brevity and clarity.

Figure 3:
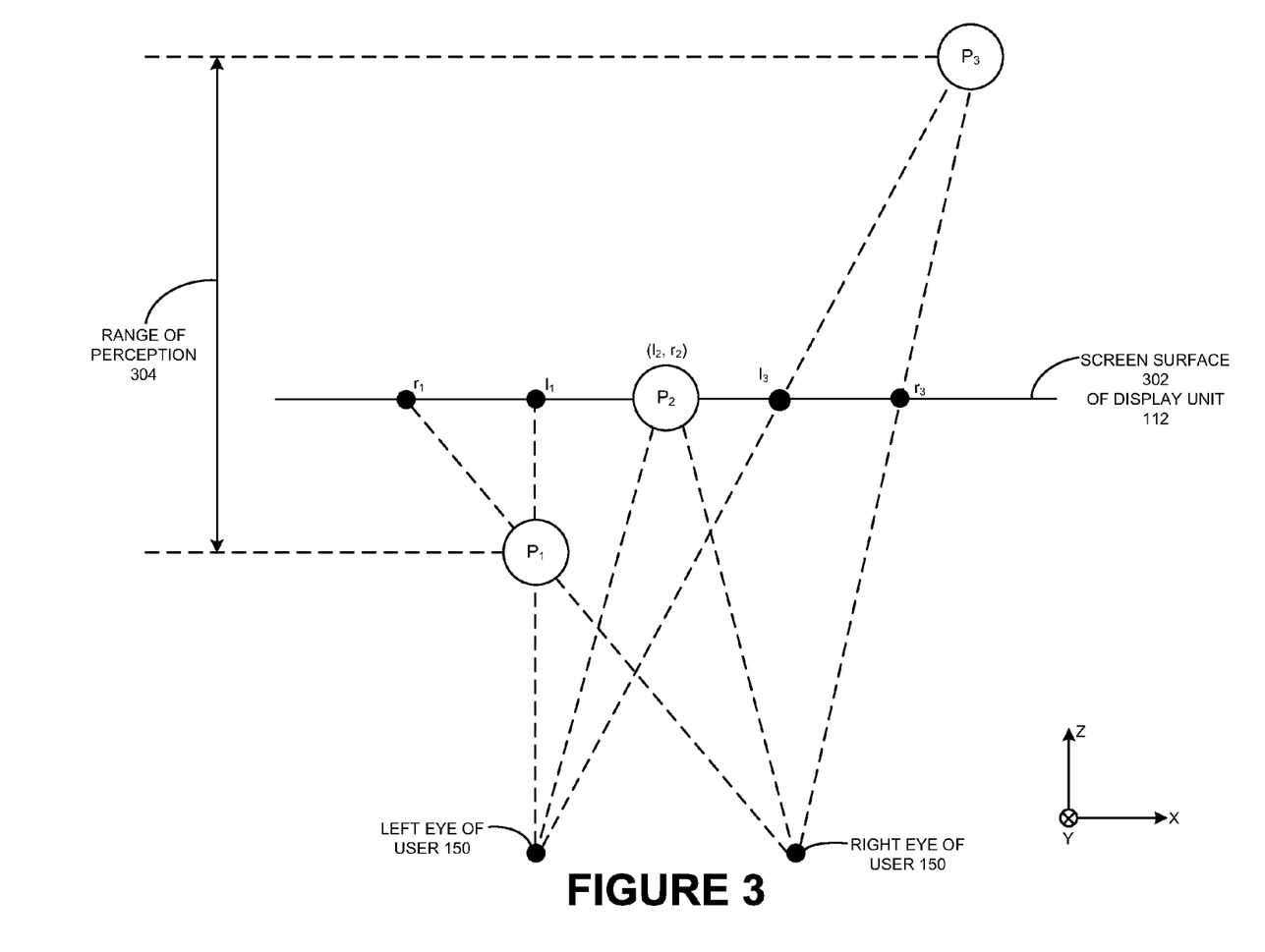
FIG. 3 is a schematic view of user perception of pixels of a video frame of three-dimensional (3D) video data viewed on the display unit of the client device of FIG. 1.

In one or more embodiments, the slight offset between left eye image 162 and right eye image 164 discussed above may correspond to a vector difference in position between corresponding pixels thereof. In one or more embodiments, the aforementioned pixel-dependent vector difference may be termed image disparity. FIG. 3 shows perception of pixels of a video frame $132_{1-N}$ on part of user 150. Here, a pixel $P_1$ may be perceived in front of a screen surface 302 of display unit 112 instead of on screen surface 302 because of a disparity in corresponding pixels of video data 116 thereof. In other words, the left eye view ($l_1$) and the right eye view ($r_1$) of pixel $P_1$ may not converge at a point on screen surface 302; $l_1$ and $r_1$ may intersect in front of screen surface 302 instead of converging on screen surface 302.

With respect to pixel $P_2$, perception may be exactly on screen surface 302; in other words, the left eye view ($l_2$) and the right eye view ($r_2$) of pixel $P_2$ may converge exactly at a point on screen surface 302. Pixel $P_3$ may be perceived behind screen surface 302 instead of on screen surface 302. In other words, the left eye view ($l_3$) and the right eye view ($r_3$) of pixel $P_3$ may converge at a point behind screen surface 302 instead of on screen surface 302. For the given three pixels $P_1$, $P_2$ and $P_3$, a range of perception 304 may be defined to be a dimensional range delimited by $P_1$ and $P_3$ along an axis perpendicular to a plane of screen surface 302. In FIG. 3, range of perception 304 is along z-axis. The x-axis and y-axis are also shown for reference purposes.

In one or more embodiments, range of perception 304 may be dependent on factors such as distance 204 and dimensional parameters 202A-C. In one or more embodiments, the aforementioned factors may also have a comfortable range of perception associated therewith in which user 150 is expected to experience minimal eye strain. In one or more embodiments, processor 108 may be configured to dynamically calculate the comfortable range of perception based on metadata 140; in alternate embodiments, processor 108 may be configured to utilize a predefined/pre-calculated comfortable range of perception (e.g., comfortable range of perception 186) stored in memory 110.

Exemplary embodiments may provide a means to ensure that pixels/macroblocks (or, to generalize, sub-portions) of video frames $132_{1-N}$ (or, video sequence) associated with video data 116 remain within comfortable range of perception 186 for user 150 in accordance with the target viewing conditions (e.g., distance 204, dimensional parameters 202A-C, functions of metadata 140 such as a ratio of screen width 202B and distance 204). In one or more embodiments, viewing experience of user 150 may be comfortable if all elements of video frames $132_{1-N}$ remain within comfortable range of perception 186 close to screen surface 302. For example, comfortable range of perception 186 may include regions behind screen surface 302 but not regions in front of screen surface as user 150 is expected to experience less eye strain when pixels are perceived behind screen surface 302 rather than in front of screen surface 302 and on screen surface 302. Variations therein are within the scope of the exemplary embodiments discussed herein.

In one or more embodiments, perception of pixels of video frame $132_{1-N}$ may be brought within comfortable range of perception 186 through remapping (e.g., linearly, non-linearly) the disparity discussed above. An example linear adaptation of a disparity d to a target comfortable range of perception 186 R=[$d'_{max}$,$d'_{min}$] may be expressed as a mapping function:

$$F(d) = \frac{(d'_{max} - d'_{min})}{(d_{max} - d_{min})}(d - d_{min}) + d'_{min} \quad (1)$$

where $d'_{max}$ and $d'_{min}$ are the upper and lower dimensional limits of comfortable range of perception 186 (R), and $d_{max}$ and $d_{min}$ are the upper and lower dimensional limits of range of perception 304.

Thus, in one or more embodiments, F(d) may be calculated through processor 108 (e.g., by executing post-processing engine 130 thereon) for each pixel/macroblock of video frame $132_{1-N}$. In one or more embodiments, the each pixel/macroblock may then be rendered on display unit 112 in accordance with the calculated F(d) such that perception thereof is brought within comfortable range of perception 186.

In one example embodiment, as a subset of the remapping discussed above, left eye image 162 and/or right eye image 164 may be adjusted to remove disparities that prospectively cause eye strain to user 150. The disparities may be removed by forcing all image points to lie on or behind screen surface 302. This may be accomplished through a simple translation (and appropriate cropping) of the appropriate left eye image 162 and/or right eye image 164 with respect to each other by a minimum disparity therebetween. The disparity range and depth ordering may, therefore, be preserved.

Tackling other forms of disparities that prospectively cause eye strain to user 150 is within the scope of the exemplary embodiments discussed herein. For example, there may be a disparity associated with a misalignment between two cameras being utilized to capture left eye image 162 and right eye image 164; the aforementioned disparity manifests as a difference in y-coordinates (along y-axis of FIG. 3; or, a coordinate along a plane of the screen of display unit 112 that is perpendicular to a line connecting the left eye and the right eye of user 150) between $l_1$ and $r_1$, $l_2$ and $r_2$ and/or $l_3$ and $r_3$. Although the left eye and the right eye of user 150 are aligned properly with respect to the y-axis, the brain of user 150 may be unable to decode the aforementioned disparity. In one or more embodiments, through the execution of post-processing engine 130, processor 108 may be configured to reduce eye strain due to the aforementioned disparity; once again, the operations performed through processor 108 may take metadata 140 into account.

In one or more embodiments, other parameters (e.g., part of image/video parameters 156) may also be adjusted through the execution of post-processing engine 130 based on metadata 140 discussed above. It is known to one skilled in the art that eye strain may increase with a shift in visible light frequency from a violet end to a red end of the color spectrum. Also, eye strain may increase for a color saturation level exceeding a threshold. Therefore, in one or more embodiments, execution of post-processing engine 130 to adjust color and/or contrast (and/or other image/video parameters 156) appropriately in accordance with metadata 140 may provide for a eye-healthy viewing experience to user 150.

It should be noted that metadata 140 such as dimensional parameters 202A-C and distance 204 may also be input by user 150 through a user interface of an operating system 142 and/or an application 144 executing on client device 104. Further, metadata 140 may be captured externally (e.g., sensor 172, external means such as an external device) and transmitted/transferred to client device 104. Still further, metadata 140 may be acquired from operating system 142 and/or application 144 by processor 108 and utilized during execution of post-processing engine 130. All reasonable variations are within the scope of the exemplary embodiments discussed herein.

Exemplary embodiments discussed herein may not be limited to a combination of a client device 104 and a single user 150. In a scenario involving multiple users such as collective viewing of a movie, comfortable range of perception 186 may be calculated by conservatively accounting for ranges of perception of the multiple users. Processor 108 may then perform the appropriate mapping/disparity corrections to reduce eye strain for all of the users based on metadata 140 (e.g., individual metadata 140 such as individual distance 204, common metadata 140 such as dimensional parameters 202A-C).

Figure 4:
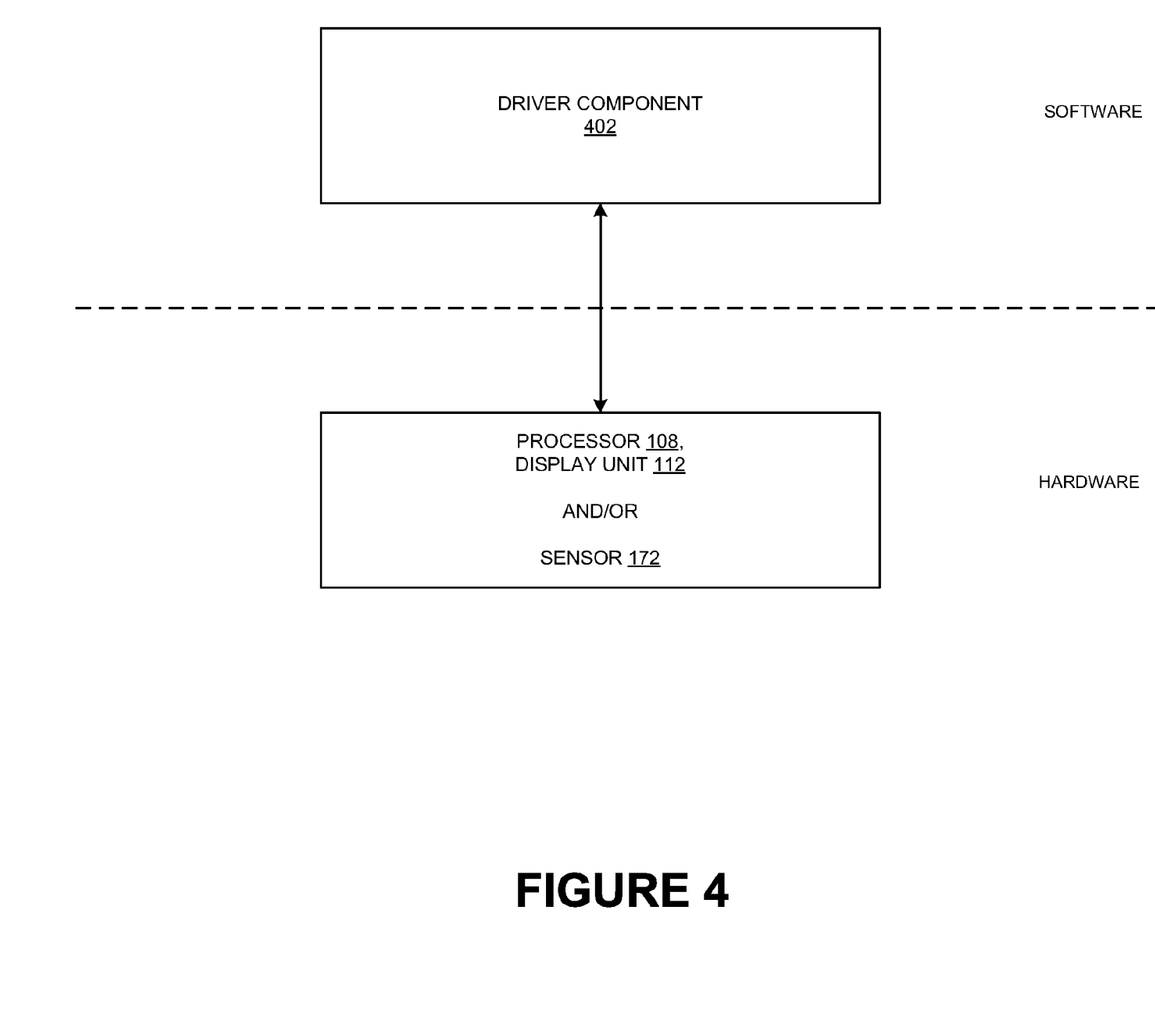
FIG. 4 is a schematic view of interaction between a driver component and a processor of the client device of FIG. 1, the display unit of the client device of FIG. 1 and/or a sensor associated with the client device of FIG. 1, according to one or more embodiments.

In one or more embodiments, the tracking of metadata 140, estimation of comfortable range of perception 140 and/or the mapping/disparity reduction/adjustment of image/video parameters 156 discussed above may be initiated through a driver component (e.g., a set of instructions) associated with processor 108, display unit 112 and/or sensor 172. FIG. 4 shows interaction between a driver component 402 and processor 108, display unit 112 and/or sensor 172, according to one or more embodiments. In one or more embodiments, the triggering of the aforementioned processes may occur through user 150 depressing a physical button on client device 104, through the user interface of application 144 and/or operating system 142.

In one or more embodiments, driver component 402 may also be packaged with application 144 and/or operating system 142 executing on client device 104; driver component 402 may be loaded onto client device 104 following booting thereof. The post-processing operations discussed herein may also execute as foreground processes or background processes. Further, it is obvious that user 150 may be provided a capability to bypass the post-processing operations through various means (e.g., through the physical button, through the user interface of application 144 and/or operating system 142).

Figure 5:
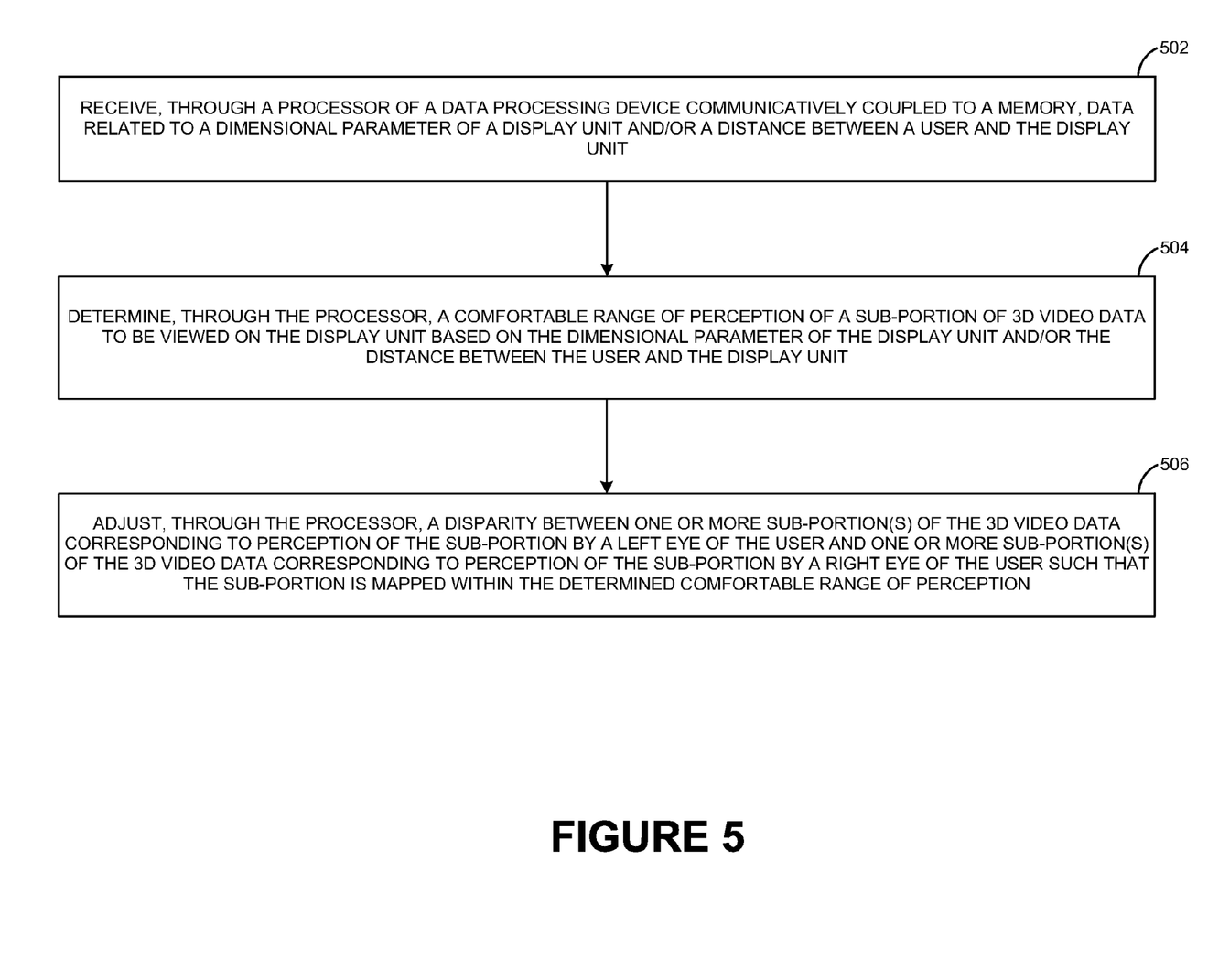
FIG. 5 is a process flow diagram detailing the operations involved in mapping sub-portions of 3D video data to be rendered on the display unit of FIG. 1 within a comfortable range of perception of a user thereof, according to one or more embodiments.

FIG. 5 shows a process flow diagram detailing the operations involved in mapping sub-portions of 3D video data 116 to be rendered on display unit 112 within comfortable range of perception 186 of user 150 thereof, according to one or more embodiments. In one or more embodiments, operation 502 may involve receiving, through processor 108, data related to a dimensional parameter 202A-C of display unit 112 and/or distance 204. In one or more embodiments, operation 504 may involve determining, through processor 108, comfortable range of perception 186 of a sub-portion of 3D video data 116 on display unit 112 based on dimensional parameter 202A-C and/or distance 204. In one or more embodiments, comfortable range of perception 186 may be related to a perception range within which user 150 is expected to experience reduced eye strain.

In one or more embodiments, operation 506 may then involve adjusting, through processor 108, a disparity between one or more sub-portion(s) of 3D video data 116 corresponding to perception of the sub-portion by a left eye of user 150 and one or more sub-portion(s) of 3D video data 116 corresponding to perception of the sub-portion by a right eye of user 150 such that the sub-portion is mapped within the determined comfortable range of perception 186. In one or more embodiments, the disparity adjustment may be performed across one or more spatial dimension(s).

Although the present embodiments have been described with reference to specific example embodiments, it will be evident that various modifications and changes may be made to these embodiments without departing from the broader spirit and scope of the various embodiments. For example, the various devices and modules described herein may be enabled and operated using hardware circuitry (e.g., CMOS based logic circuitry), firmware, software or any combination of hardware, firmware, and software (e.g., embodied in a machine readable medium). For example, the various electrical structures and methods may be embodied using transistors, logic gates, and electrical circuits (e.g., application specific integrated (ASIC) circuitry and/or Digital Signal Processor (DSP) circuitry).

In addition, it will be appreciated that the various operations, processes, and methods disclosed herein may be embodied in a machine-readable medium and/or a machine-accessible medium compatible with a data processing system (e.g., client device 104). Accordingly, the specification and drawings are to be regarded in an illustrative rather than a restrictive sense.

What is claimed is:

1. A method to reduce eye strain of a user during viewing of three-dimensional (3D) video data on a display unit associated with a data processing device, comprising:

receiving, through a processor of the data processing device communicatively coupled to a memory, data related to at least one of a dimensional parameter of the display unit and a distance between the user and the display unit;

determining, through the processor, a comfortable range of perception of a frame of the 3D video data on the display unit based on the at least one of the dimensional parameter of the display unit and the distance between the user and the display unit, the comfortable range of perception being related to a perception range within which the user is expected to experience reduced eye strain; and adjusting, through the processor, a disparity between a left-eye image of a frame of the 3D video data corresponding to perception of the left-eve image of the frame by a left eye of the user and a right-eye image of the frame of the 3D video data corresponding to perception of the a right-eve image of the frame by a right eye of the user, such that the frame is mapped within the determined comfortable range of perception, the disparity adjustment being performed across at least one spatial dimension;

wherein the adjusting includes, tier each pixel or subset of pixels of the frame, mapping the pixel or subset of pixels to be within the determined comfortable range;

wherein each pixel or subset of pixels of the frame are rendered to the display unit, in accordance with the mapping.

2. The method of claim 1, wherein adjusting the disparity further comprises at least one of:

at least one of: linearly and non-linearly remapping the frame of the 3D video data within the comfortable range of perception;

forcing data points related to the frame to lie one of: behind and on a screen surface of the display unit corresponding to the viewing of the user; and adjusting at least one of: the left-eye image of a frame of the 3D video data corresponding to the perception of the the left-eye image of the frame by the left eye and the right-eye image of a frame of the 3D video data corresponding to the perception of the right-eye image of the frame by the right eye.

3. The method of claim 1, further comprising adjusting, through the processor, at least one video parameter of the 3D video data based on the at least one of the dimensional parameter of the display unit and the distance between the user and the display unit to further reduce the eye strain of the user.

4. The method of claim 1, further comprising at least one of:

obtaining the at least one of the dimensional parameter of the display unit and the distance between the user and the display unit through a user interface of at least one of:

an application executing on the data processing device and an operating system executing on the data processing device;

sensing the data related to the distance between the user and the display unit through a sensor associated with the data processing device to enable the processor determine the distance between the user and the display unit; and receiving the data related to the at least one of the dimensional parameter of the display unit and the distance between the user and the display unit from a device external to the data processing device.

5. The method of claim 1, further comprising triggering at least one of the determination of the comfortable range of perception and the adjustment of the disparity through a driver component associated with at least one of: the processor, the display unit and a sensor configured to sense the data related to the distance between the user and the display unit.

6. The method of claim 5, comprising providing the driver component as at least one of: packaged with an operating system executing on the data processing device and packaged with an application executing on the data processing device.

7. The method of claim 4, further comprising providing a capability to the user to bypass the determination of the comfortable range of perception and the adjustment of the disparity through the user interface of the at least one of the application and the operating system.

8. The method of claim 1, wherein adjusting the disparity further comprises forcing data points related to the frame to lie behind a screen surface of the display unit corresponding to the viewing of the user.

9. The method of claim 1, wherein adjusting the disparity further comprises forcing data points related to the frame to lie on a screen surface of the display unit corresponding to the viewing of the user.

10. The method of claim 1, wherein the comfortable range of perception includes a range from a determined point behind a screen surface of the display unit to a determined point in front of the screen surface of the display.

11. A data processing device comprising:
a memory comprising 3D video data; and
a processor communicatively coupled to the memory, the processor being configured to receive data related to at least one of a dimensional parameter of a display unit and a distance between a user and the display unit, based on which the processor is further configured to execute instructions to:
determine a comfortable range of perception of a frame of the 3D video data on the display unit based on the at least one of the dimensional parameter of the display unit and the distance between the user and the display unit, the comfortable range of perception being related to a perception range within which the user is expected to experience reduced eye strain during viewing of the 3D video data on the display unit, and
adjust a disparity between a left-eye image of a frame of the 3D video data corresponding to perception of the left-eye image of the frame by a left eye of the user and right-eye image of the frame of the 3D video data corresponding to perception of the a right-eye image of the frame by a right eye of the user, such that the frame is mapped within the determined comfortable range of perception, the disparity adjustment being performed across at least one spatial dimension;
wherein the adjusting includes, for each pixel or subset of pixels of the frame, mapping the pixel or subset of pixels to be within the determined comfortable range;
wherein each pixel or subset of pixels of the frame are rendered to the display unit, in accordance with the mapping.

12. The data processing device of claim 11, wherein the processor is configured to execute instructions to adjust the disparity through at least one of: at least one of:
linearly and non linearly remapping the frame of the 3D video data within the comfortable range of perception,
forcing data points related to the frame to lie one of: behind and on a screen surface of the display unit corresponding to the viewing of the user, and
adjusting at least one of: the left-eye image of a frame of the 3D video data corresponding to the perception of the the the left-eye image of the frame by the left eye and the right-eye image of a frame of the 3D video data corresponding to the perception of the right-eye image of the frame by the right eye.

13. The data processing device of claim 11, wherein the processor is further configured to execute instructions to adjust at least one video parameter of the 3D video data based on the at least one of the dimensional parameter of the display unit and the distance between the user and the display unit to further reduce the eye strain of the user.

14. The data processing device of claim 11, further comprising a driver component to trigger at least one of the determination of the comfortable range of perception and the adjustment of the disparity.

15. The data processing device of claim 14, wherein the driver component is provided as at least one of: packaged with an operating system executing on the data processing device and packaged with an application executing on the data processing device.

16. A system comprising:
a data source of 3D video data; and
a client device communicatively coupled to the data source, the client device being configured to receive the 3D video data and data related to at least one of a dimensional parameter of a display unit and a distance between a user and the display unit, based on which the client device is further configured to:
determine a comfortable range of perception of a frame of the 3D video data on the display unit based on the at least one of the dimensional parameter of the display unit and the distance between the user and the display unit, the comfortable range of perception being related to a perception range within which the user is expected to experience reduced eye strain during viewing of the 3D video data on the display unit, and
adjust a disparity between a left-eye image of a frame of the 3D video data corresponding to perception of the left-eye image of the frame by a left eye of the user and a right-eye image of the frame of the 3D video data corresponding to perception of the a right-eye image of the frame by a right eye of the user, such that the frame is mapped within the determined comfortable range of perception, the disparity adjustment being performed across at least one spatial dimension;
wherein the adjusting includes, for each pixel or subset of pixels of the frame, mapping the pixel or subset of pixels to be within the determined comfortable range;
wherein each pixel or subset of pixels of the frame are rendered to the display unit, in accordance with the mapping.

17. The system of claim 16, wherein the client device is configured to adjust the disparity through at least one of:
at least one of: linearly and non-linearly remapping the frame of the 3D video data within the comfortable range of perception,
forcing data points related to the frame to lie one of: behind and on a screen surface of the display unit corresponding to the viewing of the user, and
adjusting at least one of: the left-eye image of a frame of the 3D video data corresponding to the perception of the the left-eye image of the frame by the left eye and the right-eye image of a frame of the 3D video data corresponding to the perception of the the right-eye image of the frame by the right eye.

18. The system of claim 16, wherein the client device is further configured to adjust at least one video parameter of the 3D video data based on the at least one of the dimensional parameter of the display unit and the distance between the user and the display unit to further reduce the eye strain of the user.

19. The system of claim 16, further comprising a driver component associated with at least one of: a processor of the client device, the display unit and a sensor configured to sense the data related to the distance between the user and the display unit to trigger at least one of the determination of the comfortable range of perception and the adjustment of the disparity through the client device.

20. The system of claim 19, wherein the driver component is provided as at least one of: packaged with an operating system executing on the client device and packaged with an application executing on the client device.

21. The system of claim 16, wherein one of:
the client device is also the data source, and
the data source is communicatively coupled to the client device through a computer network.

22. The system of claim 16, wherein at least one of:
the client device comprises a processor communicatively coupled to a memory to obtain the at least one of the dimensional parameter of the display unit and the distance between the user and the display unit through a user interface of at least one of: an application executing thereon and an operating system executing thereon,
the system further comprises a sensor associated with the client device to sense the data related to the distance between the user and the display unit to enable the processor determine the distance between the user and the display unit, and the processor of the diem device is configured to receive the data related to the at least one of the dimensional parameter of the display unit and the distance between the user and the display unit from a device external to the client device.

23. The system of claim 22, wherein the user is provided a capability to bypass the determination of the comfortable range of perception and the adjustment of the disparity by the client device through the user interface of the at least one of the application executing on the client device and the operating system executing on the client device.

* * * * *